United States Patent Office 3,830,744
Patented Aug. 20, 1974

---

3,830,744
SILICONE ACETATE BRAKE FLUID
Frank J. Traver, Troy, N.Y., assignor to
General Electric Company
No Drawing. Continuation-in-part of abandoned application Ser. No. 125,397, Mar. 17, 1971. This application May 29, 1973, Ser. No. 364,505
Int. Cl. C09k 3/00
U.S. Cl. 252—78                              6 Claims

ABSTRACT OF THE DISCLOSURE

A silicone polymer useful as a brake fluid comprising a polymer of the structure,

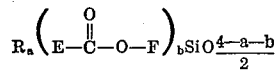

where R is a monovalent hydrocarbon radical or a halogenated monovalent hydrocarbon radical, F is selected from

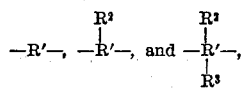

R′ is selected from divalent hydrocarbon radicals and substituted divalent hydrocarbon radicals, E is selected from the group consisting of

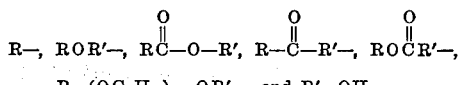

$R-(OC_nH_{2n})_z-OR'-$, and $R'-OH$, where R, $R^2$ and $R^3$ are selected from monovalent hydrocarbon radicals and halogenated monovalent hydrocarbon radicals, $n$ is a whole number that varies from 2 to 4, and $z$ varies from 1 to 4, where $a$ varies from 1.11 to 2.02, $b$ varies from 0.023 to 1.00 and the sum of $a+b$ varies from 2.024 to 3.00. The present invention comprises a process in which any brake fluid system is operated using the above polysiloxane polymer as the brake fluid.

BACKGROUND OF THE INVENTION

The present case is a continuation-in-part of parent case Ser. No. 125,397, filed Mar. 17, 1971, and now abandoned.

This invention relates to polysiloxane polymers and, in particular, this invention relates to ester polysiloxane polymers useful as brake fluids.

At the present time, there are no brake fluids presently in the market which have outstanding performance in many brake fluid tests. The desirable specifications or ratings in the brake fluid suggested tests require the fluid to have a higher equilibrium reflux boiling temperature and flash point than that of the presently available glycol based fluids.

The brake fluids presently on the market are basically polyether glycols which vary from case to case, depending on the type of polyether units and the number of polyether units in the polymer chain. Such brake fluids are hydroscopic in that they will pick up large quantities of water from the atmosphere. Problems are associated with the packaging and handling of such brake fluids since unless extreme precautions are exercised these brake fluids will pick-up large amounts of water from the atmosphere due to their hydroscopicity which will possibly result in a brake fluid with poor performance characteristics as well as a brake fluid that may be unsafe because it can cause a failure of the brakes. It is undesirable to have excess water in the brake fluid since it will separate out at low temperature such as —40° F. Such water may form ice crystals and may cause the brakes to freeze. Further, it is undesirable to have large amounts of water in the brake fluid in that at the high temperatures, which are commonly present in the operation of automobile brakes, the water may evaporate to form vapor which may rupture the hydraulic lines causing failure of the brakes and possibly the vapor may cause a very sluggish, inefficient braking action.

It is, thus, desirable to have a brake fluid on the market which picks up a minimum amount of water through hygroscopicity and which is compatible with the amount of water it picks up from the atmosphere so that when the brake fluid is subjected to temperatures as low as —40° F., brake failure does not result. Brake fluids which have exceptional properties are disclosed in the present case as well as in the applications of Frank J. Traver Ser. No. 125,396, filed Mar. 17, 1971, Frank J. Traver Ser. No. 125,398, filed Mar. 17, 1971 and Frank J. Traver, U.S. Pat. 3,725,287, issued Apr. 3, 1973.

Accordingly, it is one object of the present invention to provide a polysiloxane polymer useful as a brake fluid which has exceptional performance as an automobile brake fluid.

It is another object of the present invention to provide an ester polysiloxane useful as hydraulic fluid for a central hydraulic system.

It is an additional object of the present invention to provide a brake fluid which is only slightly hydroscopic and is compatible with the water that it picks up from the atmosphere such that the water will not separate out either at low temperatures or high temperatures from the brake fluid mass.

It is yet another aim of the present invention to provide a polysiloxane polymer useful as a brake fluid which has a high flash point, fire point and autogenous condition temperature which far exceeds those of prior brake fluids.

SUMMARY OF THE INVENTION

In accordance with the present invention there is provided a process for operating any brake fluid system comprising activating means, activated means, reservoir means and hydraulic line means connecting said activating means, said activated means and reservoir means comprising substantially filling said activating means, said activated means, said reservoir means and said hydraulic line means with a polysiloxane polymer of the structure, (I)   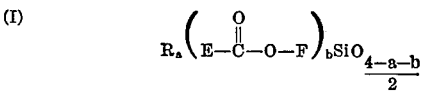

where R is a monovalent hydrocarbon radical or a halogenated monovalent hydrocarbon radical, F is selected from

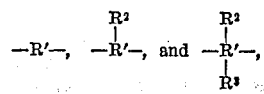

R′ is selected from the class consisting of a divalent hydrocarbon radical and hydrocarbon substituted divalent hydrocarbon radicals, $R^2$ and $R^3$ are selected from monovalent hydrocarbon radicals and halogenated monovalent hydrocarbon radicals, E is selected from the group consisting of

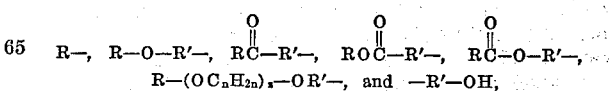

$R-(OC_nH_{2n})_z-OR'-$, and $-R'-OH$;

$n$ is a whole number that varies from 2 to 4 and $z$ varies from 1 to 4 where $a$ varies from 1.1 to 2.02, $b$ varies from 0.023 to 1.00, and the sum of $a+b$ varies from 2.024 to 3.00. More specifically, R′ is selected from alkylene or arylene radicals of up to 20 carbon atoms, hydrocarbon substituted alkylene and arylene radicals of up to 20 carbon atoms, and R, $R^2$, $R^3$ are preferably alkyl radicals such as methyl. Further, more preferably, $a$ varies from 1.23 to 2.02, $b$ varies from 0.055 to 0.92 and the sum of $a+b$ varies from 2.074 to 2.5. This polysiloxane polymer is obtained by reacting an alkenoic alcohol with an organic acid in the presence of a strong acid catalyst so as to esterify the alkenoic alcohol and then reacting the resulting ester by SiH-olefin addition with a hydropolysiloxane in the presence of a platinum catalyst.

It is understood that the present ester polysiloxane can be utilized in a brake fluid in any vehicle brake hydraulic system or as a hydraulic fluid in any hydraulic system. Thus, the present ester polysiloxane can be used as a brake hydraulic fluid in either automobile brake drum hydraulic systems or automobile disc brake hydraulic systems or other vehicle braking hydraulic systems. Such hydraulic brake systems usually comprise an activating means which may be a brake pedal and the other component that act upon the hydraulic fluid. The brake pedal or activating means is connected through appropriate hydraulic lines which can be referred to simply as hydraulic line means to the master cylinder. The master cylinder which is present in most vehicle hydraulic brake systems can also be referred to as reservoir means. Finally, the hydraulic lines are connected to the disc brake components or brake drum components in the wheels or other such vehicle wheel components which translate the hydraulic force transmitted through the hydraulic lines into mechanical braking force in the vehicle of a vehicle may simply be referred to herein as activated means. The invention of the mechanical parts of a particular vehicle hydraulic brake system forms no part of the present invention. The invention of the present case lies in the process of the use of the ester polysiloxane of the present case in any vehicle hydraulic brake system. Accordingly, any vehicle hydraulic brake system or any hydraulic system for that matter in accordance with the present invention will generally comprise activating means, reservoir means, activated means and hydraulic line means connecting the activating means, activated means and reservoir means, wherein all of said means are substantially filled with the ester polysiloxane of the present case. Thus, the present invention lies in the process of the use of the ester polysiloxanes of the present case as a brake hydraulic fluid in any vehicle hydraulic brake system and the mechanical parts of such brake hydraulic systems which form no part of the present invention will be referred to in the specification and claims of the present case for brevity as activating means, activated means, reservoir means and hydraulic line means connecting said activating means, said activated means and reservoir means.

DESCRIPTION OF THE PREFERRED EMBODIMENT

The radicals R, $R^2$, $R^3$ and R' appearing in Formula (1) are well known in the art and are typified by radicals usually associated with silicon-bonded organic groups in the case of R, $R^2$, $R^3$ and are generally associated with divalent hydrocarbon radicals in the case of R'.

The organic radicals represented by R include monovalent hydrocarbon radicals, halogenated monovalent hydrocarbon radicals and cyanoalkyl radicals. Thus, the radical R may be alkyl, such as methyl, ethyl, propyl, butyl, octyl; aryl radicals such as phenyl, tolyl, xylyl, naphthyl radicals; aralkyl radicals such as benzyl, phenylethyl, radicals; olefinically unsaturated monovalent hydrocarbon radicals such as vinyl, allyl, cyclohexyl radicals; cycloalkyl radicals such as cyclohexyl, cycloheptyl radicals; halogenated monovalent hydrocarbon radicals such as chloromethyl, dichloropropyl, 1,1,1-trifluoropropyl, chlorophenyl, dibromophenyl and other such radicals; cyanoalkyl radicals such as cyanoethyl, cyanopropyl, etc. Preferably, the radicals represented by R, $R^2$ $R^3$ have less than 8 carbon atoms and in particular it is preferred that R, $R^2$, $R^3$ be methyl, ethyl or phenyl. The radicals R in the different hydrocarbon substituent groups in Formula (1) may be the same or different. The radicals represented by R' may be any divalent hydrocarbon radical or polyvalent hydrocarbon radical substituted by hydrocarbon radicals such as alkylene or arylene radicals or hydrocarbon substituted alkylene or arylene radicals of less than 20 carbon atoms such as methylene, ethylene, various isomers of the phenylene radicals or substituted phenylene radicals. In the preferred embodiment, R' is propylene. Further, R' can be alkylene, hydrocarbon substituted alkylene, arylene or hydrocarbon substituted alkenylene, alkenylene, as well as alkynylene or hydrocarbon substituted alkynylene. The radicals represented by R' in different hydrocarbon substituent groups may be the same or different. The preferred structural formula which comes within the average unit formula as set forth in Formula (1) is as follows:

(2)     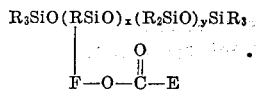

In this formula, R is preferably methyl, $x$ varies from 1 to 10 and $y$ varies from 1 to 15.

The compound of Formula (1) may also have the structural formula as follows:

(3)     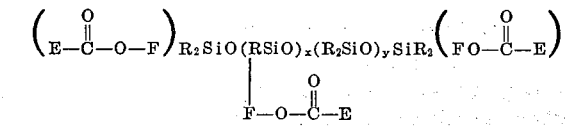

where R, F, $x$ and $y$ have the meanings and values indicated above. The most preferred compounds that are useful as brake fluids come within the scope of Formulas (1), (2) and (3) are as follows:

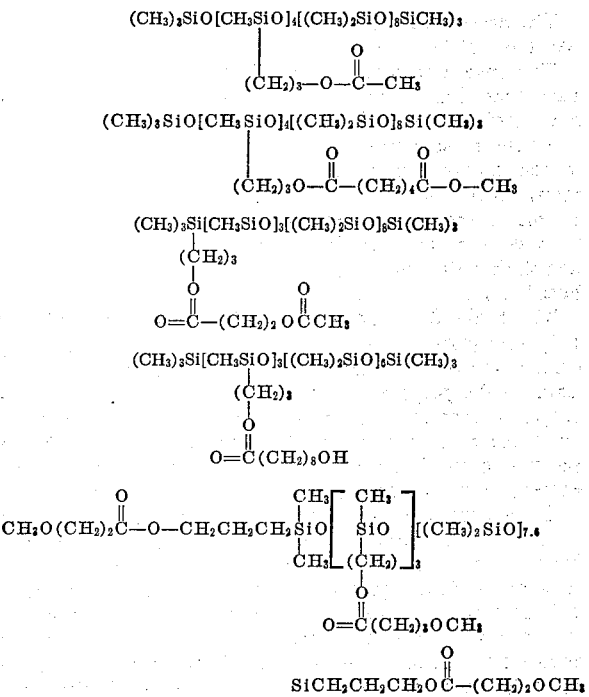

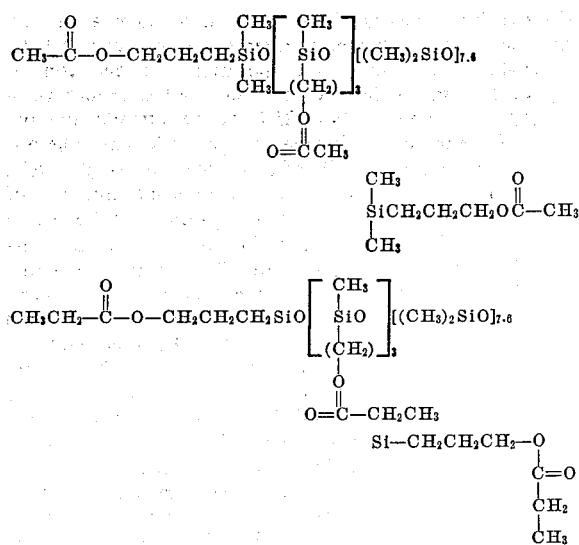

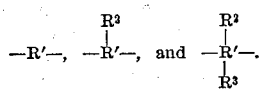

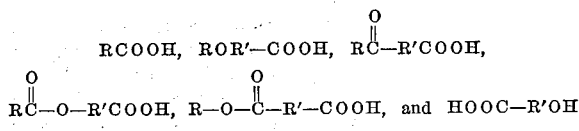

One method for forming the compounds of Formula (1) comprises the reaction of a compound of the formula $CH_2=CH-G-OH$ with an organic acid so as to esterify the acid where G is selected from $$-R'-, \quad -R'-, \quad \text{and} \quad -R'- \overset{R^2}{\underset{R^3}{|}}$$

Thus, the organic acid may be selected from the group comprising $$RCOOH, \quad ROR'-COOH, \quad R\overset{O}{\underset{\|}{C}}-R'COOH,$$

$$R\overset{O}{\underset{\|}{C}}-O-R'COOH, \quad R-O-\overset{O}{\underset{\|}{C}}-R'-COOH, \quad \text{and} \quad HOOC-R'OH$$

where R and R' were defined previously and where the substituent groups R and R' in the organic acid may be the same or different from the R and R' substituent groups attached to the silicon atom in Formula (1). The esterification reaction is preferably carried out in the presence of the catalyst which may be a strong acid such as sulfuric acid, hydrochloric acid or nitric acid. Preferably, the catalyst is sulfuric acid or toluene sulfonic acid. Although the reaction may be carried out at room temperature, it has been discovered that the esterification reaction proceeds too slowly at that temperature. Preferably, the reaction temperature is in the range of 50° to 150° C. and more preferably in the range of 70° to 130° C. The reaction is allowed to proceed for 2 to 15 hours and preferably from 5 to 10 hours. Further, the esterification reaction is preferably carried out in the presence of an inert solvent selected from toluene and xylene, benzene, mineral spirits and other inert solvents. After the reaction has proceeded to completion, that is, after the reaction period of 5 to 10 hours, the acid is neutralized with sodium bicarbonate and additional inert solvent is added to the reaction mixture. Then the organic layer is washed with water and the resulting organic layer is separated from the aqueous layer that forms. Then the ester is distilled from the organic layer by a distillation procedure so as to separate out the pure ester material. In place of the esterification reaction, the organic acid may be reacted with sulfonic chloride so as to give an organic carbonyl chloride product. This reaction is preferably carried out at room temperature, that is, 20° to 50° C. The reacted acid chloride can then be reacted with an alkenyl-alcohol in the presence of a basic media such as ammonia, triethylamine, pyridine, as hydrogen chloride acceptors at room temperature, to product the resulting ester compound.

To obtain an ester product with a polyether group therein, the polyether alcohol of the formula

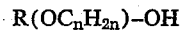

is reacted with the Na at room temperature where R, n, and z are defined previously. The resulting compound which has the formula $R(OC_nH_{2n})_zONa$ is then reacted with a compound of the formula, $$X-R^4-COO-G-CH-CH_2,$$

where X is a halogen, G is selected from

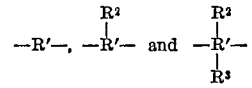

and $R^4$ is a divalent or polyvalent hydrocarbon radical selected from arylene and alkylene radicals of up to 20 carbon atoms and hydrocarbon substituted alkylene and arylene radicals of up to 20 carbon atoms. The reaction product of this reaction is (4)  $R(OC_nH_{2n})_z-O-R^4-COO-G-CH-CH_2$ which can now be reacted by SiH-olefin interchange with a hydrogen polysiloxane to obtain the final ester poly-siloxane. The reaction between the sodium polyether and the halogen olefin may be conducted at room temperature although elevated temperatures of 50°–80° C. is prepared. Further, an inert solvent may be utilized in the reaction although such a solvent is not necessary.

To produce the deired reaction products of the present case, the olefinic ester is then reacted with a compound of the formula, (5) 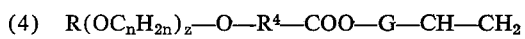

in the presence of a platinum catalyst, where R has the meaning defined previously and $a$ varies from 1.11 to 2.02, $b$ varies from 0.023 to 1.00 and the sum of $a+b$ varies from 2.024 to 3.00. Preferably in the above formula, $a$ varies from 1.23 to 2.02, $b$ varies from 0.055 to 0.92 and the sum of $a$ plus $b$ varies from 2.074 to 2.5. The hydropolysiloxane is added to the reaction pot and heated to a temperature in the range of 100° to 150° C. to remove any free water and toluene is then added to the reaction pot. The mixture is heated to a temperature in the range of 100° to 150° C. to remove any free water by toluene-water azeotrope. Once the solution of the hydropolysiloxane and the toluene is dried in accordance with the azeotrope technique, a trace of platinum catalyst is added to the mixture. Then the ester is slowly added to the reaction pot. The addition is exothermic so the temperature is controlled by the olefin addition rate and is usually maintained in the range of 25°–75° C. During the reaction, the SiH peak disappearance is followed by infrared scan. Once the addition of olefin to silicon hydride is completed, the solution is filtered through fuller's earth to remove any precipitates. Then the solution is stripped to remove solvents and low boiling fractions to yield the desired polysiloxane which falls within Formula (1) and which is the desirable brake fluid of the present case. By the rate of the addition of the olefin, the temperature is able to be controlled in the range of 25° to 100° C. and, more preferably, in the range of 25° to 75° C.

A suitable catalyst for addition of organohydrogen polysiloxane to the alkenoic ester or polyether ester are the various platinum and platinum compound catalysts known in the art. These catalysts include elemental platinum in the finely divided state which can be deposited on charcoal or alumina, as well as various platinum compounds such as chloroplatinic acid, the platinum hydrocarbon complex of the type shown in U.S. Pats. 3,159,-601, 3,159,662, as well as the platinum alcoholic complexes prepared from chloroplatinic acid which are described and claimed in Lamoreaux, U.S. Pat. 3,220,972.

Preferably, the platinum catalyst is added to the organohydrogen polysiloxane located in the reaction chamber to which is also added a solvent and then the olefinic ester is slowly added to the reaction mixture at the reaction temperatures described above. Whether elemental platinum or one of the platinum complex catalysts is used, the catalyst is generally used in amounts sufficient to provide about $10^{-4}$ to $10^{-6}$ moles of platinum per mole of the ester reactant. As mentioned previously, the reaction is effected by adding the organohydrogen polysiloxane to an inert solvent being selected from the group of benzene, toluene, xylene, mineral spirits and other inert solvents. The reaction mixture is preferably heated to 25° to 75° C. before the addition of the alkenoic acid ester. The olefinic ester is then added to the hydrogen polysiloxane solvent mixture at an addition rate so as to maintain the reaction temperature in the range of 25° to 75° C. during the reaction. Preferably, the reaction is allowed to proceed to completion in 4 to 15 hours and preferably in 5 to 8 hours. After the reaction period is over, a sample of the reaction mixture may be checked by infrared analysis for SiH bonds to determine how far the reaction has proceeded to completion. When at least 95% of the SiH organopolysiloxane has been converted to the reaction product, the reaction mixture may be cooled and the reaction may be considered to have proceeded to a sufficient extent for the conversion of the ester polysiloxane.

In the case where the olefinic ester has free hydroxyl groups, the SiH-olefin addition reaction may be carried out in the presence of a buffer in order for the reaction to properly proceed. Any of the commonly known buffers may be used to buffer the reaction mixture or solution containing the hydrogen polysiloxane and the solvent therein, such that the reaction proceeds in accordance with the desired conditions.

Another method of protecting the free hydroxyl groups in an olefinic ester having such free hydroxyl groups is to first react the olefinic ester with trimethylchlorosilane such that the trimethylchlorosilane attaches itself to the free hydroxyl groups. the SiH-olefin addition reaction can then be carried out without any buffer present. After the reaction product has been obtained from the reaction, then the polysiloxane ester can be subjected to a mild hydrolysis with water or a trace amount of a weak acid can be added to the polysiloxane ester so as to liberate the trimethylsilane group and form hydroxyl units at the terminal position of the polysiloxane ester such that it once again has free hydroxyl groups. This method is only used when the ester moiety has free hydroxyl groups attached to it so as to allow the SiH-olefin addition reaction to proceed in the proper manner.

Preparation of the organohydrogen polysiloxane of Formula (5) which can contain both saturated and olefinically unsaturated hydrocarbon groups may be carried out by any of the procedures well known to those skilled in the art. Such polysiloxanes can be produced by following the procedure involving the hydrolysis of one or more hydrocarbon-substituted chlorosilanes in which the substituents consist of saturated hydrocarbon groups, the crude hydrolyzate containing a mixture of linear and cyclic polysiloxanes. Further, one or more hydrocarbon-substituted chlorosilanes with hydrocarbon-substituents comprising one or more olefinically unsaturated hydrocarbon groups are hydrolyzed to produce a crude hydrolyzate containing a mixture of linear and cyclic polysiloxanes. The two crude hydrolyzates are polymerized by being treated with KOH to form mixtures of low boiling, low molecular weight cyclic polymers mixed with undesirable materials such as monofunctional and trifunctional chlorosilane starting material. The resulting compositions are fractionally distilled and there is collected two pure products of the low boiling, low molecular weight cyclic polymers free of any significant amount of monofunctional and trifunctional groups. In order to depolymerize the two hydrolyzates, there is added to them a catalyst and the mixture is heated to a temperature above 150° C. to produce and recover by evaporation a product consisting of low molecular weight cyclic polysiloxanes comprising, for example, about 85% of the tetrasiloxane and 15% of the mixed trisiloxane and pentasiloxane. The distillate consisting essentially of low molecular weight cyclic dimethyl polymers free of any significant amounts of monofunctional and trifunctional groups is collected in the vessel. The then dried cyclic siloxane contains less than 50 parts per million of water. The cyclic methylvinyl and diphenyl cyclic siloxanes are prepared in the same way. The two cyclic siloxanes are added in the desired proportions in a reaction vessel so as to be subjected to an equilibrium reaction to form the hydrogenpolysiloxanes of Formula (5). Thus, about 2.5 to 17 mole percent cyclic diphenylsiloxane can be added to 83 to 97.5 mole percent dimethyl cyclic siloxanes. If desired, and depending upon the type of compound that is to be produced, 0.1 to 1.0 mole percent of methylvinyl cyclic siloxane may be mixed with dimethyl and diphenyl cyclic siloxanes or other desired proportions of the cyclic siloxanes can be used to produce the desired polymer. To the above mixture of pure cyclic siloxanes there is added a polymerization catalyst such as KOH. The potassium hydroxide breaks a ring of cyclic siloxane to form a potassium silonate, which can then attack other cyclics to break the rings and increase the chain length of the siloxanes formed. There is further added to the reaction mixture in the amount of one or more monofunctional compounds calculated to function as end-blockers for limiting the degree of polymerization and consequently the lengths and molecular weights of the linear polysiloxane chains and for stabilizing the polymers.

Usually a small amount of monofunctional compounds are added to function as end-blockers so as to regulate the chain length of the polymers. The functional compounds there may be employed satisfactorily for controlling polymer growth include, among others, hexamethyldisiloxane, tetramethyldiethoxydisiloxane, dihydrogentetraethoxydisiloxane, divinyltetraethoxydisiloxane, and deca-methyltetrasiloxane. The equilibration reaction is carried out from 2 to 4 hours until about 85% of the cyclic diorganosiloxanes have been converted to polymer end-stopped with monofunctional groups. When the 85% conversion point has been reached, there are just as many polymers being converted to cyclic siloxanes as there are cyclic siloxanes being converted to the polymers. At that time there is added to the mixture a sufficient amount of an acid donor such as phosphoric acid, that will neutralize the KOH catalyst so as to terminate the polymerization reaction. The cyclic diorganosiloxanes in the reaction mixture are then distilled off to leave the polyhydrogensiloxane which is useful in the present invention. Hydrocarbon-substituted polysiloxanes with pending groups consist largely of groups other than methyl, such as ethyl or the saturated hydrocarbon groups and olefinically unsaturated hydrocarbon groups other than, or in addition to, vinyl groups can be produced by means of procedures similar to those described above or by the means of procedures modified in accordance with the characteristics of the hydrocarbon groups to be included.

The above procedure can be used to produce branch-chain polysiloxanes, as well as linear diorganopolysiloxanes, depending on the reactants that are used in the equilibration reaction.

An alternate method of producing the hydrogenpolyorganosiloxane of the present case which is used in the SiH-olefin addition reaction and which is represented by the average unit Formula (5), hexamethyldisiloxane is equilibrated with octamethyltetrasiloxane and tetramethyltetrahydrogentetrasiloxane in the proper molar proportion, in the presence of 3% of acid-treated clay, such as 3% acid on fuller's earth and the reaction mixture is heated for 5 hours at 100° to 120° C. to equilibrate the reaction mixture. After 5 hours of reaction time, when approximately 85% of the tetramers have been converted to the polymer polysiloxane, the catalyst is neutralized with a weak base and the volatile cyclics are distilled off to leave a substantially pure polyorganosiloxane. By using dihydrogentetramethyldisiloxane as the chain-stopping unit instead of hexamethyldisiloxane, there can be obtained a linear polysiloxane having hydrogen groups at the terminal positions of the polymer chain, as well as in the center position of the polymer chain. Such a polymer product allows the production of ester polysiloxanes with the ester groups attached by SiH-olefin addition reaction at the terminal positions of the chain, as well as in the center position of the polymer chain.

Besides the number of other advantages, such as a higher flash point, fire point and auto ignition temperature, as well as much lower water pick-up than the brake fluids presently on the market, the brake fluids of the present case have the advantage that they are paintable, that is, if they are spilled on a portion of the automobile, the fluid will not stain or remove the paint on the surface with which it comes in contact. This is not the case with standard brake fluids which upon coming into contact with the painted area in an automobile, will either take the paint off or stain it so that the painted area has to be repainted. This advantage is especially pertinent for automobile manufacturers where a large amount of brake fluids are handled and in which cases the brake fluids are quite often spilled on the painted areas of the automobiles. In those cases, the automobiles have to be repainted. However, since the fluids of the present case do not affect the paint, the brake fluid of the present case can be merely wiped off the painted area without any effect whatsoever on the painted area below.

Another advantage of the brake fluids of the present case is that they are non-toxic, that is, they do not give off toxic fumes and do not effect the skin or cause dermatitis of any type or sort. With the brake fluids presently on the market and especially in the case where mechanics and factory workers have to handle large amounts of brake fluids, it is very often the case that the workers develop some sort of a dermatitis as a result of contact with the brake fluids.

The following brake fluid tests are the tests recommended for evaluating the performance of a brake fluid.

A dry equilibrium reflux boiling point test is carried out by placing 60 mm. of brake fluid in a flask and boiling under specified equilibrium conditions in a 100 ml. flask. The average temperature of the boiling fluid at the end of the reflux period is determined and corrected for variations of barometric pressure, if necessary, as the equilibrium reflux boiling point. The brake fluids of the present case have an equilibrium reflux boiling point of 550° F. or above.

The next test is the wet equilibration reflux boiling point which is carried out by taking a 100 ml. sample of the brake fluid which is humidified under controlled conditions, then 100 ml. of SAE compatibility fluid is used to establish the end point of the humidification. After the humidification, the water content and the equilibrium reflux boiling point of the brake fluid are determined as in the previous test. When our fluid is run under the test conditions set forth above, there is obtained an equilibrium reflux boiling point of 342° to 360° F. or greater, depending upon the rate at which the brake fluid is heated.

For the flash point determination, the test is to take a test dish which is filled to a specified level with brake fluid. The fluid temperature is increased rapidly and then at a slower rate as the flash point is approached. At specified intervals, a small test flame is passed across the cup. The lowest temperature at which application of the test flame causes vapors above the fluid surface to ignite is the flash point. The brake fluids of the present invention have a flash point of 265° F. and greater.

If some of the volatiles are stripped off from the brake fluid of the present case, the flash point can be increased to exceedingly higher temperatures.

The procedure to determine the fire point is the same as that for determining the flash point. The fluid is heated and a flame passed over the vapor of the fluid until the vapor is ignited and the fluid continues to burn.

To determine the autogenous ignition temperature, one 125 ml. flask is immersed into a molten lead bath. The temperature of the molten lead bath is continually measured with a thermometer. As the autogenous ignition temperature is approached, one drop of the fluid is inserted into the flask and the temperature at which spontaneous ignition takes place is the autogenous ignition temperature. With the fluids of the present case the fire point is greater than 470° F. and the autogenous ignition temperature is 800° F. or greater. As mentioned previously, the fire point and the autogenous ignition temperatures should be considered in order to determine the probability of the brake fluid causing a fire. With the fluids of the present invention, because of their higher flash points and autogenous ignition temperatures, it is very unlikely that the brake fluid will burn or cause a fire in an automobile because of leaks or a rupture in the brake fluid line.

The brake fluids of the present case have also been subjected to a standard fire test where 40 g. of the brake fluid are placed in a 150 ml. beaker and the beaker then placed in a rotating stage oven which is maintained at 500° F. With the glycol based fluids, after they have been inserted into the rotating oven for 15 minutes, they burst into flames and continue to burn. Even after the flames have been extinguished and the fluid has again been exposed to oxygen, the glycol based fluids will immediately ignite and continue to burn. When the fluids of the present case were subjected to the same test, the fluids survived 12 hours with some vapor loss in the rotating stage oven which was maintained at 500° F., thus showing that the fluids of the present case were considerably more stable and non-combustible at high temperatures.

The kinematic viscosity test is a determination of the measure of the time necessary for a fixed volume of the brake fluid to flow through a calibrated glass capillary viscosimeter under an accurately reproducible head and a closely controlled temperature. The kinematic viscosity is then calculated from the measure of flow time and the calibration constant of the viscosimeter. At −40° C., the brake fluids of this invention have a viscosity of 600 to 1600 centistokes. At 212° F., the brake fluids of the present case have a viscosity that exceeds that of the glycol based fluids.

In the pH value determination, a quantity of the brake fluid is diluted with an equal volume of a methanol-water solution. The pH of the resulting mixture is measured with a prescribed pH meter assembly at 23° C. For all types of brake fluids, the brake fluids as tested must have a pH of not less than 7 or more than 11.0. A mild base is added to the brake fluids of the present invention such that as measured by the above pH method, the pH of the fluid is 7.2 to 9.6. A mild base that can be added to the fluids of the present case so that they will pass the pH standard test is barium hydroxide.

The brake fluid stability test comprises a high temperature stability test and a chemical stability test. In the case of the high temperature stability test, a 60 mm. sample of the brake fluid is heated to an appropriate holding temperature, and then the brake fluid is maintained at the holding temperature for 120±5 minutes. Then, for the next 5±2 minutes, the fluid is heated to an equilibrium reflux rate of 1 to 2 drops per second and the temperature is taken. The fluids of the present case pass this test.

In the case of chemical stability, 30±1 ml. of the brake fluid is mixed with 30±1 ml. of SAE 1 compatibility fluid in a boiling flask. First, the initial equilibrium reflux boiling point of the mixture is determined by applying heat to the flask so that the fluid is refluxing at 10±2 minutes at a rate in excess of 1 drop per second.

Then over the next 15±1 minute, the reflux rate is adjusted and maintained at 1 to 2 drops per second. This rate is maintained for an additional 2 minutes and the average value is recorded as the final equilibrium reflux boiling point. The brake fluids of the present case also pass this test.

The corrosion test comprises polishing, cleaning and weighing 6 specified metal corrosion test strips and assembling them as prescribed in the standards. This assembly is placed on a standard rubber wheel cylinder cup in a corrosion test jar and immersed in the brake fluid, capped and placed in an oven at 100° C. for 120 hours. Upon removal and cooling, the strips and the fluid cup are examined and tested. The metal test strips are observed to note whether pitting or etching are discernible, whether there are any crystalline deposits which form and adhere to the glass jar walls or the surface of the metal strips, and whether there is sedimentation in the fluid water mixture. The metal strips are weighed for weight loss and other determination are made with respect to the test. The brake fluids of the present case pass this test without any difficulty.

Another test was carried out by the present inventor in order to determine the chemical stability of the fluids of the present case as compared to the glycol based fluids that are available on the market. In the test, 40 g. of each fluid was taken and placed in a 150 mm. beaker and placed in a rotating stage oven which was maintained at 400 °F. The high temperature glycol based fluids were 80% volatilized in 5 hours. The ultra high temperature glycol based fluids were 30% volatilized in 5 hours and the fluids of the present case were volatilized only 4% in the same number of hours. In a 20-hour period, the high temperature glycol based fluid was 85 to 87% volatilized. The ultra high temperature glycol based fluid in 20 hours was 75% volatilized and the fluids of the present case were only 11% volatilized. These results indicate the thermal and chemical stability of the fluids of the present case, as compared to the brake fluids presently on the market.

The fluidity and appearance at low temperature test comprises taking brake fluid and lowering it to expected minimum exposure temperature such as −40° C. and the fluid is then observed for clarity, gelation, sedimentation, excessive viscosity or thixotropicity. The brake fluid of the present invention usually absorbs from the atmosphere or through osmosis in the hydraulic lines of a brake fluid system in an amount of water which is less than 0.5% by weight and usually less than 0.2% by weight of water. With this amount of water the brake fluid of the present case has no crystallization, cloudiness, stratification or sedimentation and upon reversion of the sample bottle in which the test is carried out, the time required for the air bubble to travel to the top of the fluid is less than 10 seconds.

In the evaporation test, 25 ml. of brake fluid is placed in a covered dish for 48 hours at 100° C. in an oven. It is then taken out and then returned to the oven for 24 hours at 100° C. and this is continued for a total period of 7 days. The nonvolatile portion is measured and examined for residues. The residues are then combined and checked for fluidity at −5° C. In the present case, there is only a loss of 2.5% by weight of volatiles after the 7 day period.

In the water tolerance test, the brake fluid is diluted with water and stored at low temperatures of −40° C. to −50° C. for 24 hours. The cold water wet fluid is first examined for clarity, stratification and sedimentation and placed in an oven at 60° C. for 24 hours. On the removal, it is again examined for stratification and the volume percent of sedimentation by centrifuging. The brake fluid of the present case is subjected to this test with the amount of water that normally it would pick up from the atmosphere upon being exposed to the atmosphere for an extended period of time, which is usually 0.2% by weight of water. With this amount of water, the ester polysiloxane brake fluid of the present case passes this test.

In the compatibility test, a sample of the brake fluid is mixed with an equal volume of SAE 1 compatibility fluid, then tested in the same way as for water tolerance except that the bubble flow time is not measured. The test is an indication of the compatibility of the test fluid with other motor vehicle brake fluids at both high and low temperatures. The polysiloxane brake fluid of the present invention is fairly compatible with most standard brake fluids.

In the resistance to oxidation tests, the brake fluid is activated with approximately 0.2% benzoyl peroxide and 5% water. A corrosion test strip assembly consisting of a cast iron and aluminum strips separated by tin foil squares at each end are then rested in a piece of SBRWC cup so that the test strips are half immersed in the fluid and oven aged at 70° C. for 166 hours. At the end of this period, the metal strips are examined for pitting, etching and weight loss. The polysiloxane brake fluid of the present case, when it was subjected to this oxidation test, passed the test without any difficulty and there was no residue or deposits formed as the result of oxidation.

The next test is the effect on rubber where the four selected SASBRWC rubber cups are measured and their hardness determined. The cups, two to a jar, are immersed in the test brake fluid, one jar is heated for 120 hours at 70° C. and the other for 70 hours at 120° C. After the cups are washed and examined for disintegration, they are remeasured and their hardness redetermined. The polysiloxane brake fluid of the present case passed this test without any difficulty.

Another test is the stroking properties test. In this test, the brake fluid is stroked under controlled conditions at an elevated temperature in a simulated motor vehicle hydraulic brake system consisting of 4 slave wheel cylinders and a master cylinder connected by steel tubing. Standard parts are used. All parts are carefully cleaned, examined and certain measurements made immediately prior to assembly for test. During the test, the temperature, rate of pressure rise, maximum pressure and rate of stroke are used as specified. The system is examined periodically during stroking to assure that excessive leakage of fluid is not occurring. Afterwards, the system is torn down, metal parts and rubber cups are examined and remeasured. The brake fluid and any resultant sludge and debris are collected, examined and tested. The polysiloxane brake fluid of the present case passed this test.

The polysiloxane brake fluid of the present case was also tested in accordance with a Federal test on corrosive instability. The polysiloxane of the present case was put into a tube and then metal plates on a hanger were placed in a tube such that they were covered with the fluid. A condenser was then placed above the tube and the tube was heated to 200° F. so that reflux could take place and the tube was heated to 200° F. for 168 hours. Then the metal sample plates were taken out, wiped and checked for corrosion and the fluid was checked for deposits or residue or stratification. The polysiloxane brake fluid of the present case also passed this test without any difficulty.

The polysiloxane hydraulic fluids of the present case far exceed the specifications of the high temperature glycol based fluids and the ultra high glycol based fluids in terms of flash point, in the evaporation test and thermal stability. Not only is the polysiloxane hydraulic fluid of the present invention more stable at high temperatures, it has a much lower viscosity at low temperatures than that specified for the best low temperature glycol based fluid presently on the market.

Brake fluids may be prepared according to the present invention which has a viscosity of as low as 600 cs. at −40° C. The advantage of this is that there is no sluggishness in the brakes at low temperatures. It should be understood that the polysiloxanes of this present case may be used in any hydraulic system, including a brake hydraulic system.

Another advantage of the brake fluid of the present case is its low water hygroscopicity or pick-up from the atmosphere. In fact, the polysiloxane brake fluid of the present invention can be said to repel water rather than to attract it and add it to the polysiloxane mass. In fact, no more than 0.20 weight percent of water is picked up by the polysiloxane brake fluid of the present case when the brake fluid is placed in a standard brake hydraulic rubber hose which is immersed in a water bath over an extended period of time. The brake fluid of the present invention will pick up even less water from the atmosphere upon being exposed to a humid atmosphere for periods as long as one year or more. With this amount of water moisture, in fact with up to 0.5 weight percent of the polysiloxane as water mixed in with the polysiloxane fluid, the polysiloxane of this case is operable as a brake fluid.

Brake fluids presently on the market, that is, glycol based brake fluids, are notoriously hygroscopic; such brake fluids will pick up from the air large amounts of water, which moisture may cause problems at low temperatures or may cause problems at high temperatures such as sluggish action of the brakes or rupture of the hydraulic brake lines.

The following examples are given below in order to better illustrate the present invention without intending to limit the invention. All parts are by weight.

EXAMPLE 1

To a one liter three necked round bottomed flask equipped with mechanical stirrer, thermometer, Y-head addition funnel, condenser, and heating mantle, there is added 190 parts of

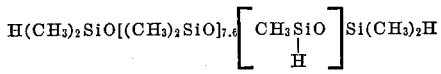

To this there is added 200 parts of dry toluene and this reaction mixture is heated to 110° C. After the temperature has reached 110° C., a 5-part fraction of allylacetate from a total change of 79 parts of allylacetate is added. At this point, 0.1 cc. of 38,500 p.p.m. Pt catalyst solution was added to initiate and perpetuate the SiH-olefin addition reaction. The reaction vessel temperature was controlled between 110° C. to 120° C. by the addition rate of allylacetate. After the final portion of allylacetate was added to the reaction flask, the solution was agitated for one hour. The solvent and low boiling siloxanes were stripped off at 200° C. and at 0.2 mm. pressure. The siloxane fluid was decolorized with carbon black and fuller's earth and then filtered through Celite 545 to yield a pale yellow liquid which has the chemical structure,

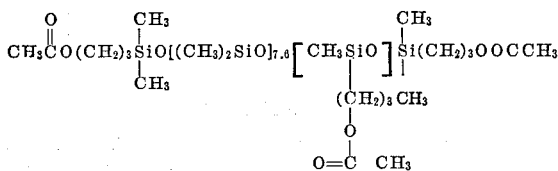

According to the equilibrium reflux boiling test, the above fluid has a boiling point of 430° F. with ½ weight percent water in it and it has a boling point of 340° F. with 1 weight percent water. Viscosity determination produced the following results:

Temperature, ° F.: Viscosity, cs.
−67 ----------------------------------- 1317
77 ----------------------------------- 38.4
100 ----------------------------------- 29.4
210 ----------------------------------- 9.5

This fluid has an open cup flash point of 470° F.

EXAMPLE 2

To a one liter three necked round bottomed flask equipped with mechanical stirrer, thermometer, Y-head, additional funnel, condenser, and heating mantle, there is added 100 parts of a compound of the formula,

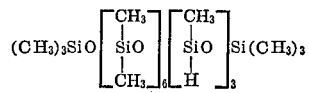

and 200 parts of dry toluene. The reaction mixture is heated to 110° C., and 5 ml. portion of an allyl ester of methyl glycolic acid (hereafter referred to as the olefin) is added. Then 0.1 of 38,500 p.p.m. Pt catalyst solution is added to initiate and perpetuate an SiH-olefin addition reaction. The pot temperature is regulated by the addition rate of the olefin. After the final olefin portion was added to the pot (total change 60 parts olefin), the solution is heated at 120° C. and rapidly stirred for an additional period to insure completion.

Once the infrared scan of the mixture verifies the completion of the reaction, the solvent and low boiling siloxanes are stripped from the reaction at 180° C. and 4 mm. The resulting siloxane fluid is decolorized and polished, filtered with carbon black and fuller's earth and then filtered through Celite 545.

The resultant fluid has the structure:

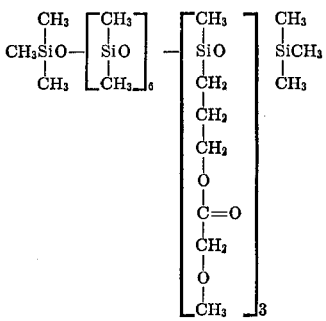

EXAMPLE 3

To a two liter three necked round bottomed flask equipped with collection bead, mechanical stirrer, thermometer, Y-head, addition funnel, condenser and heating mantle, there is added 474 parts of,

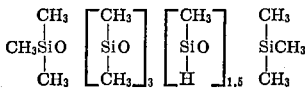

and 500 parts of dry toluene. The solution is refluxed at 120° C. to azeotrope out any residual water prior to olefin additions. To the reaction mixture, which is heated at 110° C., a 10 ml. portion of allylethylsuccinate (hereafter referred to as the olefin) is added.

To initiate the reaction 0.2 cc. of 45,000 p.p.m. of Pt catalyst solution is added. The heating source is stopped and a vigorous olefin addition reaction is maintained by addition of the olefin, whose total charge is 295 parts.

Once the olefin is completely added the reaction vessel is warmed an additional half-hour to insure completion of the SiH-olefin reaction. Upon completion of reaction, the fluid is stripped of low boilers at 192° C. at 2 mm. and filtered through Celite #545.

The resultant siloxane fluid structure is:

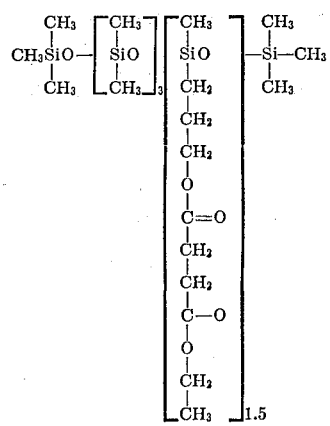

EXAMPLE 4

There was added 857 parts of

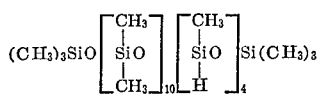

and 800 parts of toluene to a three liter three necked round bottomed flask equipped with a mechanical stirrer, Y-head, thermometer, addition funnel, condenser, and heating mantle. The mixture is heated to 120° C. to azeotrope the toluene-oil solution. After the solution is dried, 25 ml. of allylethylacetoacetate (hereafter referred to as the olefin) is added.

A platinum catalyst solution (0.5 cc. of 20,000 p.p.m. Pt) is added and an exothermic reaction noted. The reaction mixture temperature is controlled at 120±10° C. by the addition rate of the olefin. The total amount of the olefin added by weight is 550 parts.

Upon completion of the reaction, the solution is filtered through fuller's earth and then stripped to 185° C. at 3 mm.

The resultant fluid has the following structure:

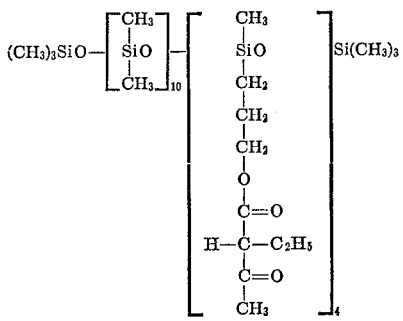

EXAMPLE 5

To a 300 ml. three necked round bottomed flask equipped with collection head, mechanical stirrer, thermometer, Y-head, addition funnel, condenser, and heating mantle, there was added 80 parts of

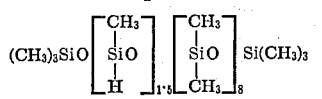

and 80 parts of dry toluene. The solution is refluxed at 120° C. to azeotrope out any residual water. After azeotroping the solution, a 2 ml. portion of the allyl ester of 2 - (2 - methoxyethoxy)ethylglycolic acid (hereinafter referred to as the olefin) is added to the reaction vessel.

An 0.05 cc. portion of 29,000 p.p.m. Pt catalyst solution is added to catalyze the SiH-olefin addition. The reaction vessel temperature is regulated by the olefin addition rate. The reaction is rated to be mildly exothermic.

When the full 359 parts of olefin has been added, the reaction is warmed at 100° C. for 2 hours to finalize the addition. The resultant siloxane fluid is stripped to 165° C. at 5 mm. to remove the boiling component and solvent.

The compound has the structure

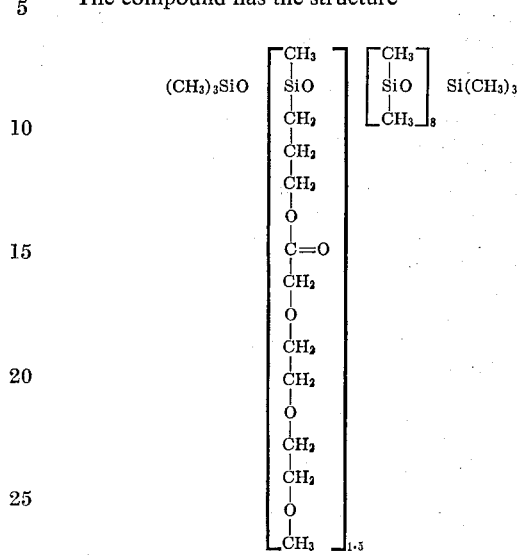

EXAMPLE 6

To a 2-liter three necked round bottomed flask equipped with a collection head, mechanical stirrer, thermometer, Y-head, addition funnel, condenser, and heating mantle, there is added 356 parts of,

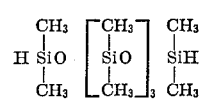

and 450 parts of toluene. The solution is heated to 110° C. and a 5 ml. portion of 1-hexene-3 ol ester of 3-methoxy-paopanoic acid (hereinafter referred to as the olefin) is added.

The finished fluid solution is stripped to 182° C. at mm. and filtered through Celite. The compound has the structure:

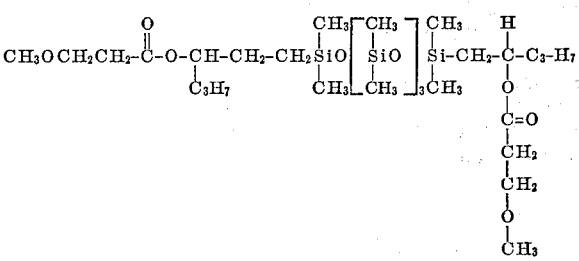

EXAMPLE 7

To a 5-liter three necked round bottomed flask equipped with a collection head, mechanical stirrer, thermometer, Y-head, additional funnel, condenser, and heating mantle, there is added 1500 parts of,

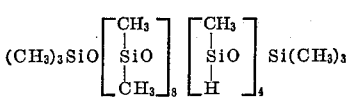

and 1000 parts of toluene. The solution is heated to 120° C. and azeotroped to remove residual water. Once the azeotrope is completed a 20 ml. portion of the 3-buten-1-ol ester of acetic acid (henceforth referred to as the olefin) is added.

To initiate and perpetuate the olefin addition, an 0.3 cc. portion of 42,500 p.p.m. Pt catalyst solution is added. The exothermic reaction is controlled by the rate of addition of the 700 parts of olefin. The reaction temperature is maintained at 100±18° C. Once the addition of the olefin is completed the pot is heated at 120° C. for 3 hours to insure complete reaction. The solution is stripped to 200° C. at 1.2 mm. and filtered through Celite #545.

The resultant siloxane compound has the structure:

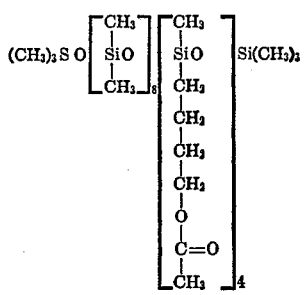

EXAMPLE 8

To a 1000 ml. three necked round bottomed flask equipped with a mechanical stirrer, thermometer, Y-head, addition funnel, condenser, and heating mantle, 265 parts of

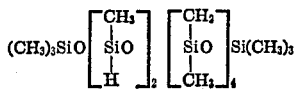

and 300 parts of dry toluene are added. The reaction mixture is heated to 110° C. and at 110° C., 6 ml. portion of allylacetylglycolate (hereinafter referred to as the olefin) is added.

A 0.125 cc. of 37,600 p.p.m. Pt catalyst solution is added to catalyze an SiH-olefin addition reaction. The 155 part of allylacetylglycolate is slowly added to the reaction solution. The rate of olefin addition to the vessel is used to control the pot temperature at 120° C.±5° C. After the SiH-olefin reaction is completed, the resultant siloxane fluid is stripped to 193° C. at 1.5 mm. and filtered through fuller's earth to polish the fluid.

The resultant fluid has the following structure:

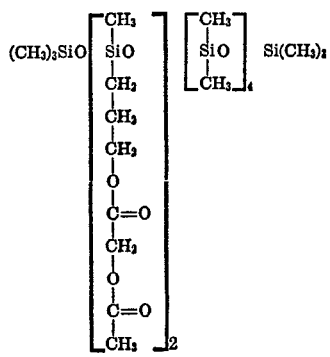

EXAMPLE 9

The brake fluid of Example 1 is subjected to the tests set forth above in the specification for motor vehicle brake fluids. The results obtained from these tests as compared with the suggested specifications for brake fluids are set forth in Table 1 below:

TABLE 1.—TEST DATA FOR EXAMPLE 1 FLUID

| Test | Suggested spec. | Example 1 fluid |
|---|---|---|
| E.R.B.P. | 446° F. | 525° F. |
| Wet E.R.B.P. | 320 | 350° F. |
| Flash point | 212 | 375° F. |
| Viscosity (−40° C.) | 1,800 | 630. |
| Viscosity (100° C.) | 1.5 cc. | 4.5 cc. |

| | | Example 2 fluid |
|---|---|---|
| pH | 7.11 | 7.2. |
| High temperature stability | 3.0° C. | Negligible. |
| Chemical stability | 3.0° C. | Do. |
| Corrosion: | | |
| (a) Metal wt. loss (approx.) | .2 mg. steel | 0.013 mg. |
| | .1 mg. aluminum | 0.004 mg. |
| | .4 mg. brass, copper | 0.104 mg. |
| (b) Appearance | No gelling | No gelling. |
| (c) Low temperature | No gelling at 23±5° C. | Do. |
| (d) Deposits | None | None. |
| (e) Sediment | 0.1% | 0.04%. |
| (f) pH | 7.11 | 7.11. |
| (g) Rubber hardness | 15 IRHD | 15. |
| (h) Rubber swell | 0.55″ | 0.015″. |
| Fluid appearance at low temperature (Example 2 fluid has less than 0.1 weight percent water): | | |
| (a) Clarity | Clear | Clear. |
| (b) Crystals | None | None. |
| (c) Flow at −40° C. | 10 | 10. |
| Evaporation | 80% | 3%. |
| Residue | Non-abrasive | None. |
| Residue flow pt. | −5° C. | −5° C. |
| Corrosion test | | Passed. |
| Oxidation test | | Do. |
| Stroking properties test | | Do. |

What is claimed is:

1. A process for transmitting force in a hydraulic system from activating means to activated means in a hydraulic system having a reservoir means wherein said activating means, said activated means and said reservoir means are connected by hydraulic line means and all of said means are substantially filled with a polysiloxane comprising applying mechanical force to said activating means where said polysiloxane polymer has the structure, $$R_a \left( E-\overset{O}{\underset{\|}{C}}-O-F \right)_b SiO_{\frac{4-a-b}{2}}$$

where R is selected from the class consisting of alkyl radicals of less than 8 carbon atoms and phenyl, F is selected from

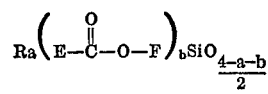

where R' is a polyvalent hydrocarbon radical of less than 20 carbon atoms, $R^2$ and $R^3$ are selected from the class consisting of alkyl radicals of less than 8 carbon atoms and phenyl, where E is selected from the group consisting of

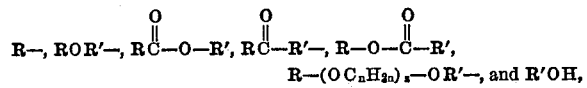

$n$ is a whole number that varies from 2 to 4 and $z$ varies from 1 to 4, where $a$ varies from 1.11 to 2.02, $b$ varies from 0.023 to 1.00 and the sum of $a+b$ varies from 2.024 to 3.00.

2. The process of Claim 1 wherein R' is selected from the class consisting of alkylene, arylene radicals and hydrocarbon substituted alkylene and arylene radicals of up to 20 carbon atoms and R, $R^2$ and $R^3$ are alkyl radicals.

3. The process of Claim 1 wherein $a$ varies from 1.23 to 2.02, $b$ varies from 0.055 to 0.92 and the sum of $a+b$ varies from 2.074 to 2.5.

4. The process of Claim 1 wherein the polymer has the structure,

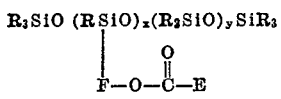

where $x$ is a whole number varying from 1 to 10 and $y$ is a whole number varying from 1 to 15.

5. The process of Claim 1 wherein the polymer has the formula,

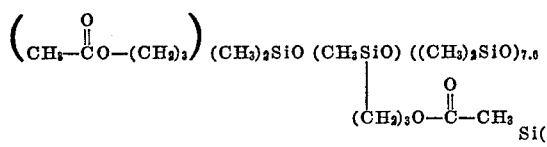

6. The process of Claim 4 wherein the polymer has the formula,

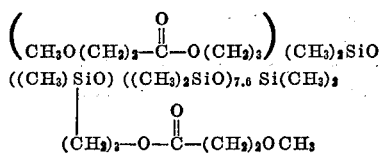

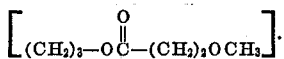

References Cited
UNITED STATES PATENTS 3,425,750    2/1969    Deane    188—352 X
3,725,287    4/1973    Traver    252—78

LEON D. ROSDOL, Primary Examiner

H. A. PITLICK, Assistant Examiner

U.S. Cl. X.R.

260—448.2 B